United States Patent [19]

Pressly

[11] Patent Number: 5,195,762
[45] Date of Patent: Mar. 23, 1993

[54] HAND TRUCK LIFT

[76] Inventor: William B. S. Pressly, 112 Caedmon Ct., Greer, S.C. 29650

[21] Appl. No.: 728,616

[22] Filed: Jul. 11, 1991

[51] Int. Cl.$^5$ .............................................. B62B 5/02
[52] U.S. Cl. .................................. 280/5.28; 280/5.3; 414/490; 414/786
[58] Field of Search ............ 414/490, 444, 446, 786, 414/467, 545; 280/5.28, 5.3; 180/8.2

[56] References Cited

U.S. PATENT DOCUMENTS

| | | | |
|---|---|---|---|
| 1,628,880 | 5/1927 | Heise | 414/545 X |
| 2,192,396 | 3/1940 | Burch | 280/5.3 X |
| 2,200,436 | 5/1940 | Van Blarcom et al. | 414/545 |
| 2,418,494 | 8/1947 | Anthony et al. | 414/545 X |
| 2,598,489 | 5/1952 | Bayer et al. | 414/467 |
| 2,650,724 | 9/1953 | Bill | 414/545 |
| 2,711,260 | 6/1955 | Butler | 414/467 X |
| 2,834,602 | 5/1958 | Hanson | 280/5.3 |
| 2,904,201 | 9/1959 | Rhodes | 414/467 |
| 3,338,586 | 8/1967 | Kirlin | 280/5.3 |
| 3,494,440 | 2/1970 | Hanson | 280/5.3 X |
| 3,550,709 | 12/1970 | Hottel | 280/5.3 X |
| 3,554,309 | 1/1971 | Abercrombie | 280/5.28 X |
| 3,896,904 | 7/1975 | Walker | 414/444 X |
| 5,096,265 | 3/1992 | Chang | 280/5.28 X |

FOREIGN PATENT DOCUMENTS

| | | | |
|---|---|---|---|
| 644065 | 10/1928 | France | 414/545 |
| 664146 | 2/1988 | Switzerland | 414/490 |

*Primary Examiner*—David A. Bucci
*Attorney, Agent, or Firm*—Bailey & Hardaway

[57] ABSTRACT

A novel hand truck lift is provided comprising an elevating assembly which is extendable downwardly to easily enable the hand truck lift to be used to move objects supported thereon up and down stairs.

10 Claims, 6 Drawing Sheets

HAND TRUCK LIFT

BACKGROUND OF THE INVENTION

This invention relates generally to the art of hand truck lifts, and more particularly to a powered hand truck lift.

U.S. Pat. No. 2,711,260 discloses a hand truck elevating or lowering attachment by which a hand truck may be lowered from an elevated platform. A hydraulically equipped hand truck is lowered from an elevated platform by the use of an abutment means which is engageable with the platform for engaging and holding the hand truck lift. U.S. Pat. No. 2,598,489 discloses a hand truck lift with a fixed lift plate and a second moveable lift plate which is slidable longitudinally along the frame of the hand truck lift.

While the prior art devices function well for their intended purposes, neither discloses a hand truck lift which is particularly suitable for moving objects retained thereon up and down stairs.

SUMMARY OF THE INVENTION

It is thus an object of this invention to provide a novel hand truck lift.

It is still a further object of this invention to provide such a novel hand truck lift which can be easily used to move objects supported thereon up and down stairs.

These as well as other objects are accomplished by a hand truck lift comprising a frame formed of spaced elongated bars, a base portion between the spaced elongated bars, a pair of spaced wheels mounted to the base portion, an elevating assembly movably attached to the frame, a pair of rollers on the elevating assembly, and means for moving the elevating assembly downwardly with respect to the frame.

Other objects and a fuller understanding of the invention will become apparent from the following description given with reference to the various figures of drawing.

BRIEF DESCRIPTION OF THE DRAWINGS

FIG. 7' is an enlarged partial view of the spaced bars of the elevating assembly.

DETAILED DESCRIPTION

In accordance with this invention it has been found that a novel hand truck lift is provided. This novel hand truck lift includes an elevating assembly by which the hand truck lift can elevate itself and an object supported thereon when the hand truck lift is in a rearwardly tilted position. Such a novel hand truck lift is provided which is powered so that elevating itself and an object supported thereon is easily accomplished with maximum control of the load. It is also found that such a novel hand truck lift can be easily used to move an object supported thereon up and down stairs.

Figure 1:
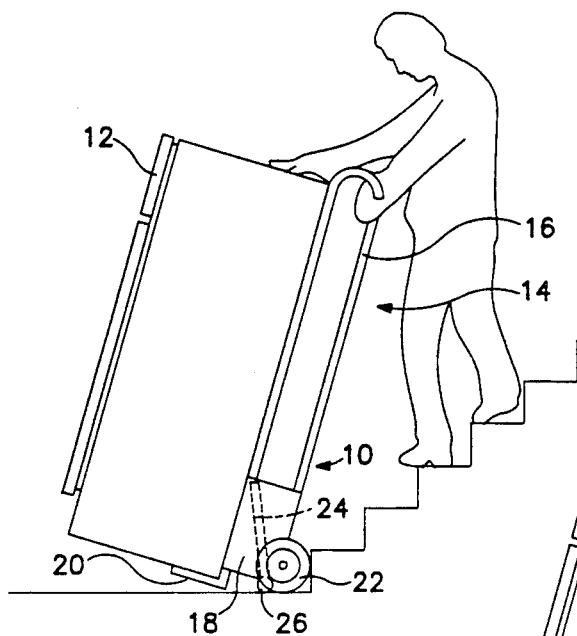
FIG. 1 is a side view of the hand truck lift positioned at the bottom of stairs.

FIGS. 1 through 4 of the drawings are side views illustrating the hand truck lift 10 being used to move an object 12 supported thereon up stairs. Referring to FIG. 1, hand truck lift 10 comprises a frame 14 which is formed of spaced elongated bars 16. At the bottom of frame 14 is a base portion 18 between spaced elongated bars 16. Base portion 18 includes an extended portion 20 at the bottom thereof which functions as a lift plate. A pair of spaced wheels 22 are mounted to the bottom of base portion 18 and can be used to roll hand truck lift 10 in either direction, preferably while hand truck lift 10 is in a rearwardly tilted position as seen in FIGS. 1 through 4.

An elevating assembly 24, seen in phantom, is movably attached at an angle to base portion 18, and a pair of rollers 26 are on the bottom of elevating assembly 24. Elevating assembly 24 is movably attached to base portion 18 at an angle so as to be extendable downwardly with respect to frame 14 while hand truck lift 10 is in a rearwardly tilted position, thereby permitting hand truck lift 10 to elevate object 12 supported thereon in a vertical manner.

It is envisioned according to this invention that frame 14 may be of various configurations other than being formed of space elongated bars 16. As such, elevating assembly 24 and its cooperating parts may be adapted to fit on an existing, standard hand truck to make lifting according to this invention possible.

FIG. 1 illustrates the initial step in using hand truck lift 10 to move object 12 up stairs. As shown, hand truck lift 10 is in a rearwardly tilted position, and spaced wheels 22 are placed against the next higher stair or proximate to it in the event the stairs overhang one another. In this rearwardly tilted position of hand truck lift 10, elevating assembly 24 is in a generally vertical position, as seen in phantom in FIG. 1, since elevating assembly 24 is attached to base portion 18 at an angle.

Figure 2:
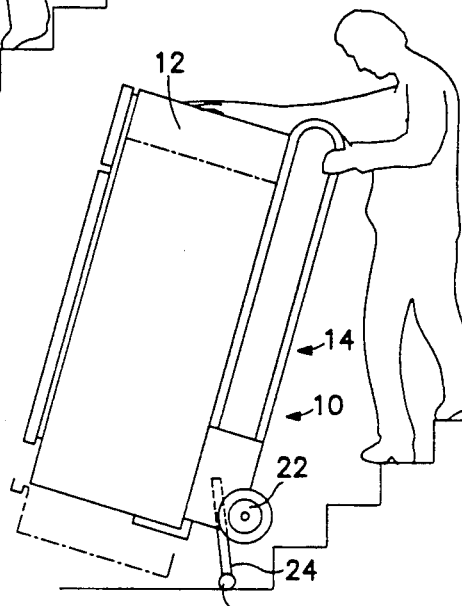
FIG. 2 is a side view of the hand truck lift in an elevated position.

FIG. 2 is a side view of hand truck lift 10 with object 12 supported thereon. In FIG. 2, elevating assembly 24 is shown in partial phantom in an extended position supporting hand truck lift 10 and object 12 in an elevating position. Elevating assembly 24 has been moved downwardly with respect to frame 14, thereby permitting hand truck lift 10 to elevate object 12 such that spaced wheels 22 are elevated at least to the height of the next higher stair. To move elevating assembly 24 downwardly, hand truck lift 10 includes means for moving elevating assembly 24, which preferably comprises an electric motor.

Figure 3:
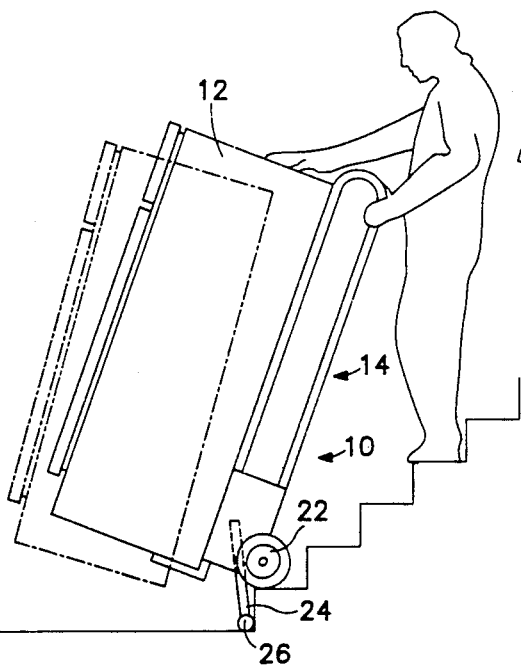
FIG. 3 is a side view of the hand truck lift positioned on the next higher stair with the elevating assembly in an extended position.

FIG. 3 is a side view of hand truck lift 10 with object 12 supported thereon showing the next step in moving object 12 to the next higher stair. As shown, elevating assembly 24 is still in an extended position, however, spaced wheels 22 are securely contacting the next higher stair. From the position of hand truck lift 10 in FIG. 2, hand truck lift 10 is rolled in a rearward direction until spaced wheels 22 are securely over the next higher stair, as shown in FIG. 3. Rollers 26 on the end of elevating assembly 24 provides such rolling capability. Hand truck lift 10 may be placed in even more of a rearwardly tilted position to further secure hand truck lift 10 on the next higher stair. It is envisioned that rollers 26 on elevating assembly 24 may be set to move in one direction or in both directions. This feature is especially ideal to ensure that hand truck lift 10 does not roll forward while elevating assembly 24 is in an extended position as shown in FIGS. 2 and 3.

Figure 4:
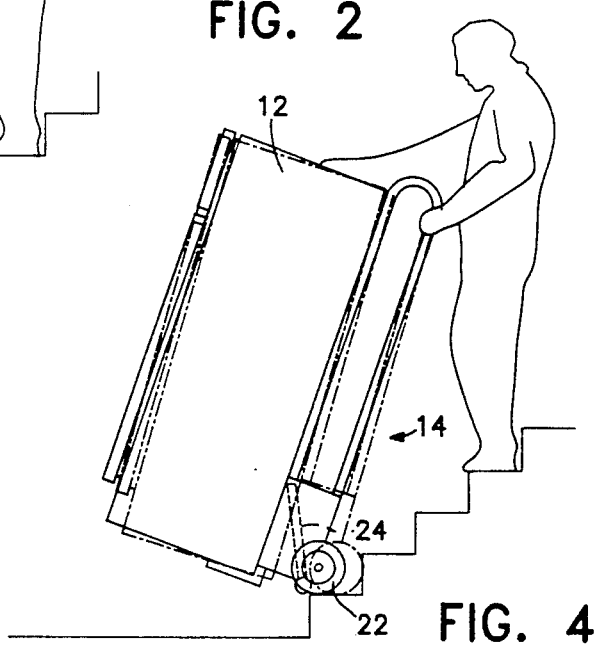
FIG. 4 is a side view of the hand truck lift on the next higher stair.

FIG. 4 is a side view of hand truck lift 10 with object 12 supported thereon showing the final step of moving object 12 to the next higher stair. As shown in phantom, elevating assembly 24 has been retracted, thereby allowing hand truck lift 10 to rest upon the next higher stair. Once again, moving elevating assembly 24, extending or retracting it, is accomplished by means for moving elevating assembly 24, which preferably comprises an electric motor. The generally vertical position of elevating assembly 24 while hand truck lift 10 is in a rearwardly tilted position is achieved due to elevating assembly 24 being attached to base portion 18 at an angle. When elevating assembly 24 is retracted, hand truck lift 10 may be rolled rearwardly to further secure hand truck lift 10 on the stair while simultaneously placing hand truck lift 10 in a position ready for movement of object 12 to the next higher stair.

The process of moving object 12 up stairs as depicted in FIGS. 1 through 4 can be reversed so that hand truck lift 10 can be used to move object 12 down stairs as well. In moving object 12 down stairs, rollers 26 on elevating assembly 24 can be set to move in both directions.

The spaced wheels 22 of hand truck lift 10 can be positioned adjacent to the edge of the next lower stair, as seen in FIG. 4, with the hand truck lift 10 in a rearwardly tilted position and elevating assembly 24 in a generally vertical position overhanging the edge. Elevating assembly 24 is then extended to contact the next lower stair, as shown in FIG. 3. Hand truck lift 10 is then rolled forward until spaced wheels 22 are over the next lower stair, while object 12 is supported on hand truck lift 10 which is supported on rollers 26 as illustrated in FIG. 2. Elevating assembly 24 ca then be retracted thereby permitting hand truck lift 10 to lower itself and object 12 to the stair, as FIG. 1 shows. This process can be repeated for as few or many stairs as desired.

Figure 5:
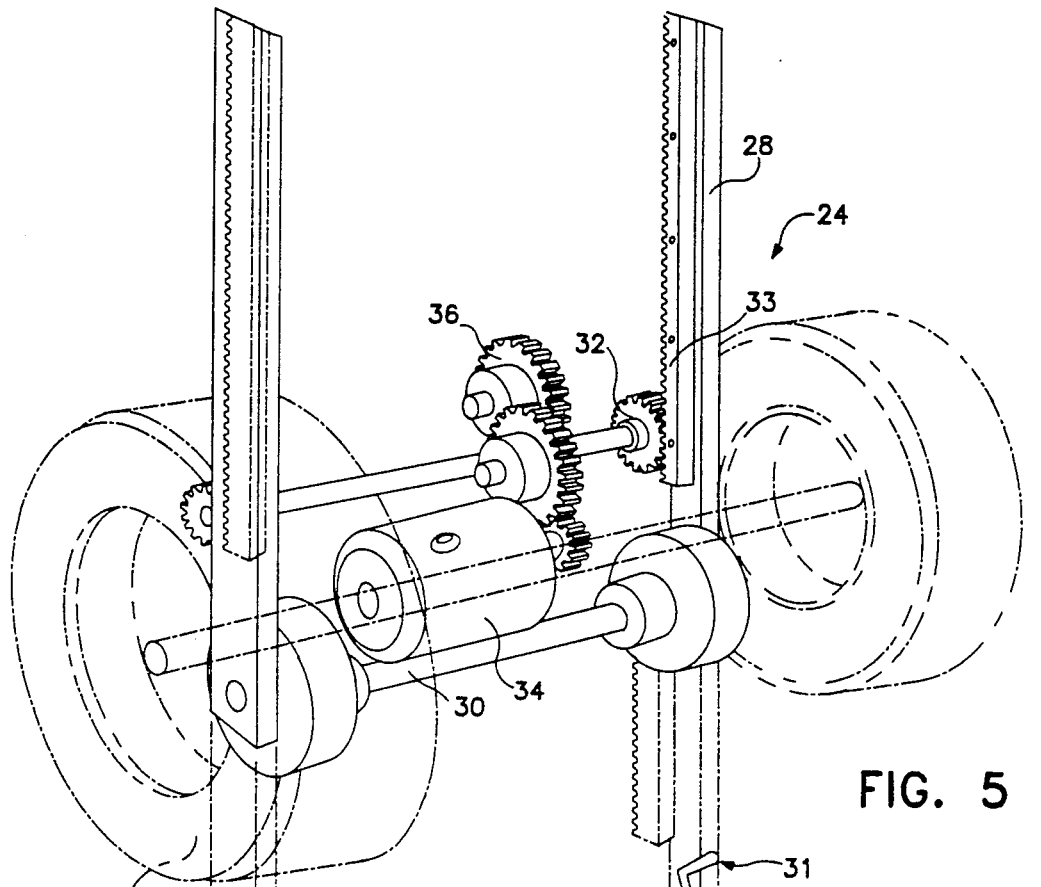
FIG. 5 is a perspective view in partial phantom of the elevating assembly.

FIG. 5 is a perspective view in partial phantom of the elevating assembly 24. Elevating assembly 24 comprises a pair of substantially parallel spaced bars 28 having rollers 26 mounted on one end thereof. Attached to bars 28 and extending through rollers 26 is a rod 30 which connects rollers 26 and provides structural support for elevating assembly 24. Spaced wheels 22 are shown in partial phantom. FIG. 5 illustrates a preferred embodiment of elevating assembly 24, as elevating assembly 24 further comprises a rack 33 and pinion 32 to enable elevating assembly 24 to be movable while attached to the base portion. An electric motor 34 and speed reducer 36 provide means for moving elevating assembly 24 downwardly as shown in phantom in FIG. 5.

FIG. 5 also illustrates rollers 26 which are part of elevating assembly 24. Ratchet 27 is fixedly attached to rod 30 as well as to rollers 26. Lever 31 is movably attached to bar 28 and can be manually set against ratchet 27. When set against ratchet 27, lever 31 prevents rollers 26 from rotating in one direction. In this manner, rollers 26 can be set so as to move in only one direction or in both directions. This uni-directional or bi-directional feature of rollers 26 provides stability to the hand truck lift while moving an object up or down a stair. Preferably, rollers 26 are set for uni-directional operation when moving an object up a stair.

Figure 6:
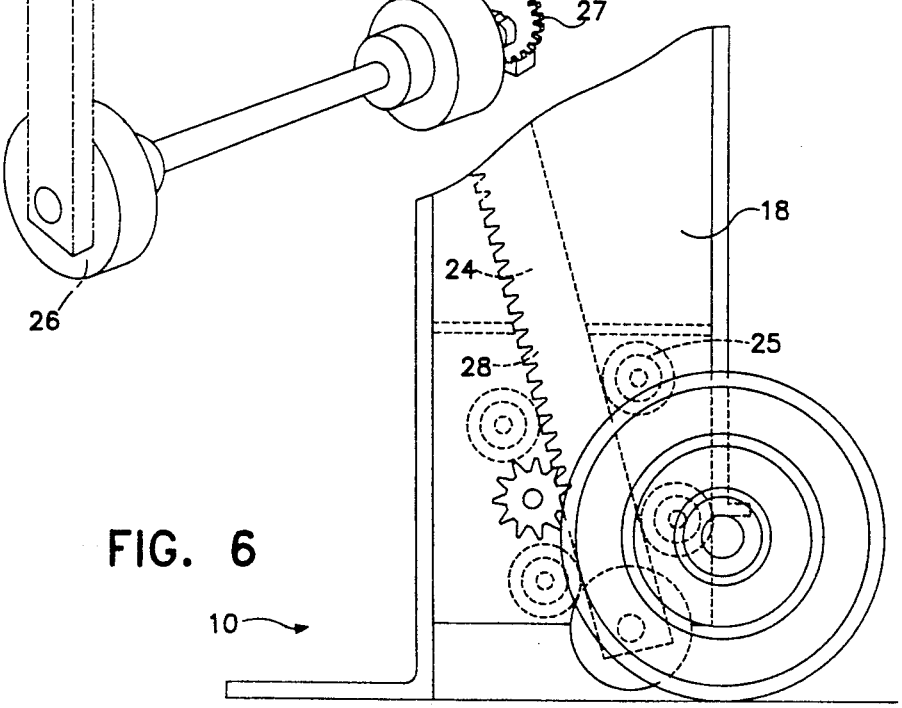
FIG. 6 is a partial side view in partial phantom of the base portion of the hand truck lift.

FIG. 6 is a partial side view of the base portion 18 of hand truck lift 10. Elevating assembly 24 is only partially shown in base portion 18. Elevating assembly 24 is seen positioned in base portion 18 at an angle in order that elevating assembly 24 can be in a generally vertical position for extension while hand truck lift 10 is in a rearwardly tilted position. Spaced bar 28 of elevating assembly 24 is shown positioned between guide bearings 25, also shown in partial phantom. Guide bearings 25 guide and provide support for elevating assembly 24. It is seen that when elevating assembly 24 is in a retracted position as in FIG. 6, hand truck lift 10 can be freely moved without elevating assembly 24 interfering in its movement.

Figure 7:
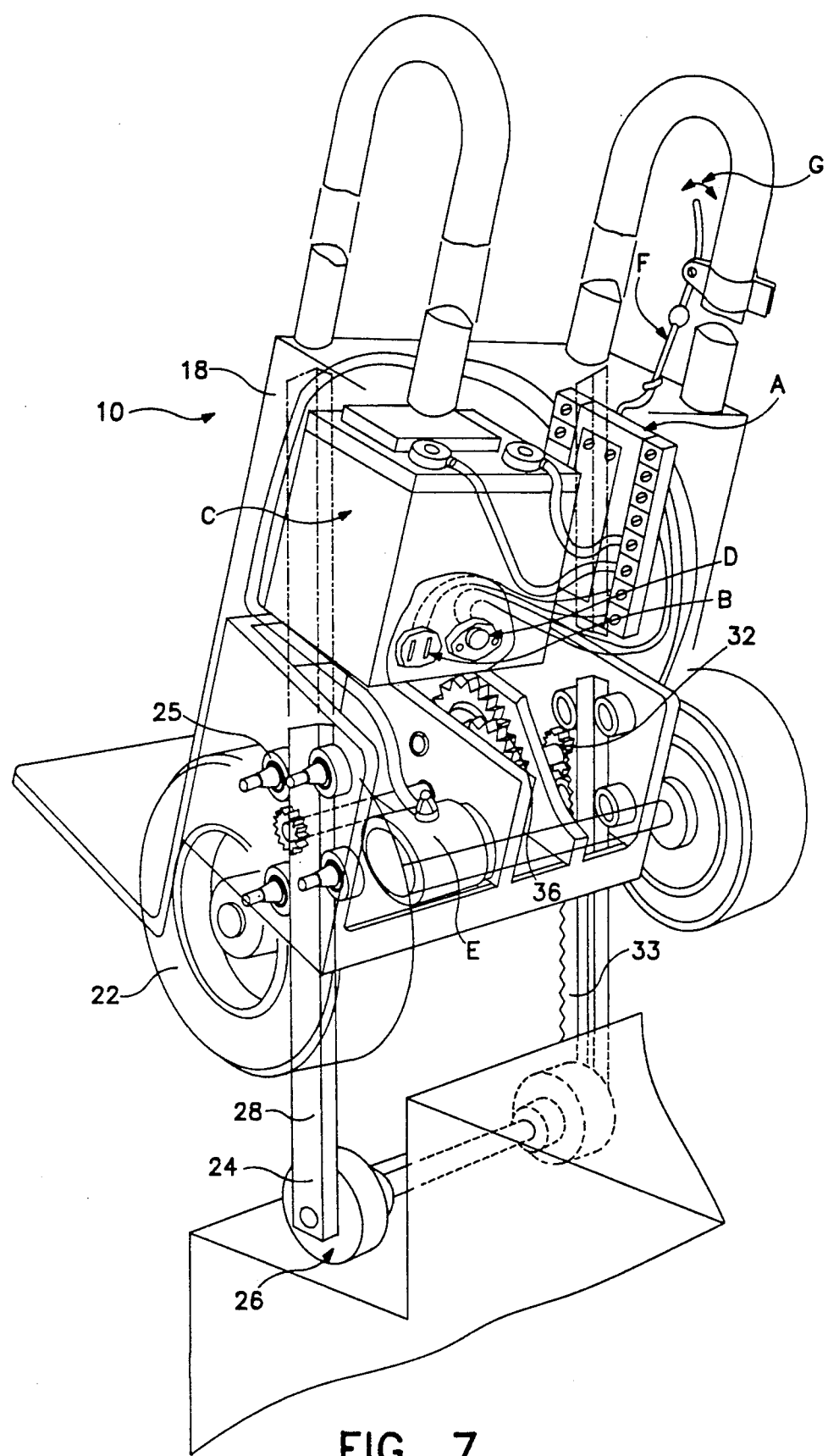
FIG. 7 is a perspective view in partial phantom of the base portion of the hand truck lift.
Figure 7:
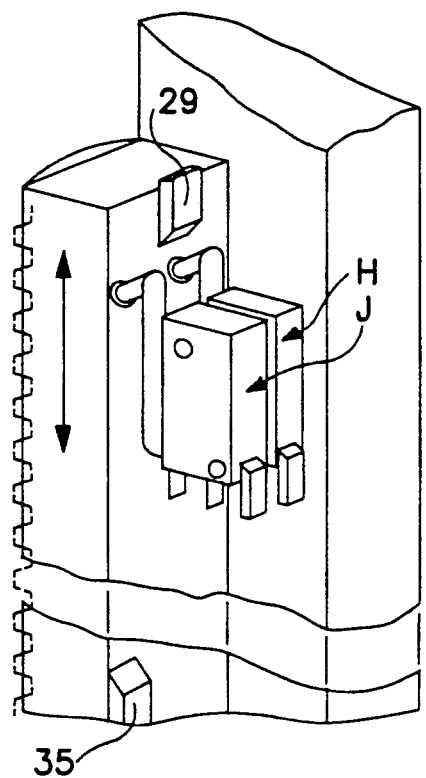

FIG. 7 is a perspective view in partial phantom of the base portion 18 of hand truck lift 10. Elevating assembly 24 is shown in partial phantom movably attached to base portion 18, as FIG. 7 also illustrates elevating assembly 24 extended downwardly onto a stair thereby elevating and supporting hand truck lift 10. It is clear that elevating assembly 24 is attached to base portion 18 at an angle so that elevating assembly 24 can be in a generally vertical position when extended and while hand truck lift 10 is in a rearwardly tilted position. Elevating assembly 24 is seen as comprising a pair of spaced bars 28 and a rack 33 and pinion 32 in order that elevating assembly 24 can be extended downwardly. Spaced bars 28 of elevating assembly 24 are held in position by guide bearings 25, as seen in FIG. 7. Spaced bars 28 ride between guide bearings 25, thereby providing stability and support to elevating assembly 24 during extension and retraction. A pair of rollers 26 are seen in partial phantom attached at the bottom of elevating assembly 24. Rollers 26 can be set so as to move in only one direction or can be set to move in both directions, a feature which provides stability to hand truck lift 10 while moving an object up a stair.

SEQUENCE OF OPERATION

Figure 8:
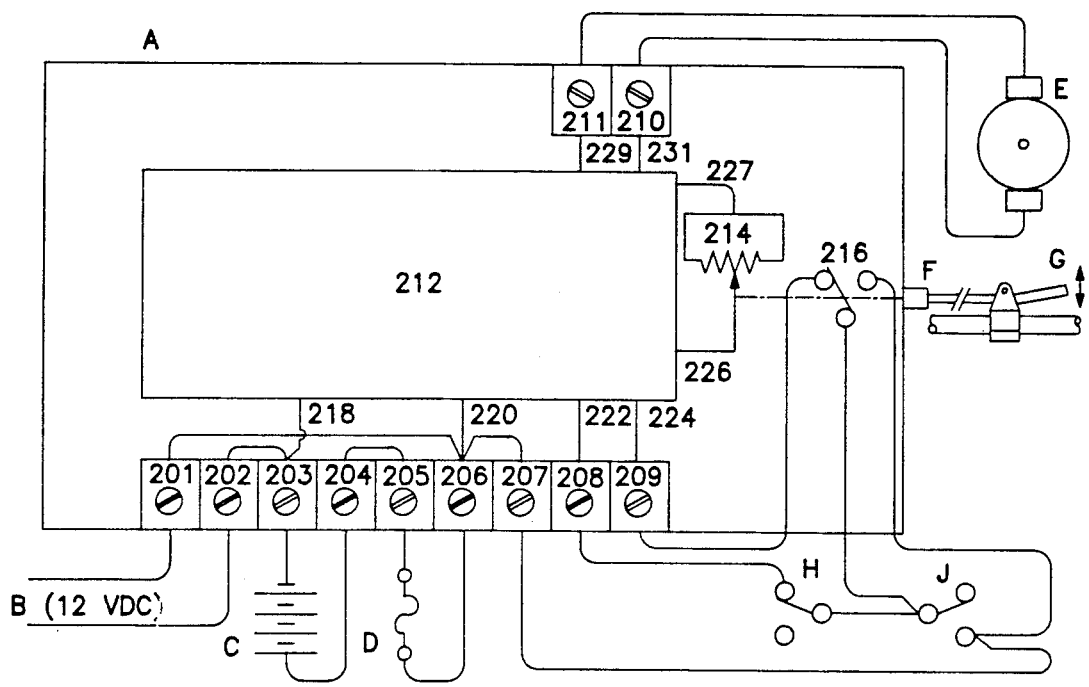
FIG. 8 is a wiring diagram of the hand truck lift.

The rest state for the hand truck lift 10 is with the spaced bars 28 of elevating assembly 24 being fully retracted, leaving retract limit switch J, as seen in FIGS. 7 and 7', on its stop 35. Switch J is thus opened and power is removed from controller A as shown in FIG. 8. Switches H and 216 are also as shown in FIG. 8. Uni-directional operation of rollers 26 is manually set. The position of hand truck 10 would be as shown in FIG. 1.

To initiate operation of hand truck lift 10 to move an object up a stair, control actuator G is squeezed, moving it to the midpoint of its range. Control potentiometer 214 and direction switch 216 are mechanically linked to control actuator G by concentric cable F. Because of this linkage, moving control actuator G to the midpoint of its range also moves control potentiometer 214 to the midpoint of its range, and direction switch 216 changes state. When direction switch 216 changes state, power is applied to controller A through the normally closed contact of extend limit switch H, terminal 208 and connection 222. In addition, proper motor direction is sensed at terminal 209 and set for extension of spaced bars 28, but power is not yet applied to the motor E, 34 in FIG. 5. Enclosed within base portion 18, as seen in FIG. 7, is a battery C which is in electrical communication with and provides power to motor E.

As control actuator G is extended beyond its center position, power is applied to motor E to extend spaced bars 28. Power is applied in direct proportion to the position of control actuator G between its center position and its full range position, with zero speed at the center position and full speed at the full range position. At any point during extension of spaced bars 28, Motor E may be stopped and its direction reversed to allow retraction of spaced bars 28.

Reversal between extension and retraction of spaced bars 28 is accomplished by allowing Control Actuator G, being spring loaded, to return to its center position. Since Control Actuator G is linked by concentric cable F to control potentiometer 214 and direction switch 216, returning Control Actuator G to its center position causes Control Potentiometer 214 to return to its center position which stops Motor E, leaving spaced bars 28 in a partially extended state. As direction Switch 216 returns to its center position, direction switch 216 changes back to its rest state which reverses the direction of Motor E, allowing retraction of spaced bars 28. As above, the speed of movement is determined by the position of Control Actuator G between its center and rest positions.

As power is applied to motor E, motor E mechanically drives the input shaft of speed reducer 36 at about 1,570 rpm. Speed reducer 36 consists of three equally rationed gear pairs, for a combined gear train ratio of 42.8. The output shaft of the speed reducer 36 turns at approximately 37 rpm.

Mounted on each end of the output shaft of speed reducer 34 is a pinion 32, which meshes with symmetrical racks 33 mounted to the spaced bars 28. Rotational motion at pinion 32 is converted to rectilinear motion at the rack 33, which forces spaced bars 28 to extend, thereby raising hand truck lift 10 and its load on rollers 26 as shown in FIG. 2.

Stops 29 and 35 are provided to work respectively in cooperation with an extend limit switch H and a retract limit switch J, as seen in FIG. 7'. As spaced bars 28 first extend, stop 35 for retract limit switch J moves away from the switch allowing closure of limit switch J and providing power continuity to controller A through limit switch H and terminal 208. Extension action continues until extend limit switch H comes into contact with stop 29, at full extension of spaced bars 28. When this occurs, extend limit switch H opens, and power is removed from controller A thus freezing spaced bars 28 in the extended position and placing spaced wheels 22 at an elevation just above the next higher step.

With elevating assembly 24 in its extended state and hand truck lift 10 resting on rollers 26, the hand truck lift 10 is moved backwards until spaced wheels 22 are securely over the next higher step as shown in FIG. 3. Hand truck lift 10 is then rotated slightly to the rear until load transfer from rollers 26 to spaced wheels 22 is accomplished as shown in FIG. 3. Once the load is transferred to spaced wheels 22, spaced bars 28 are retracted.

At the beginning of the retract function, extend limit switch H is open, retract limit switch J is closed, and control actuator G is in its full range position, holding position switch 216 in its actuated state. Spaced bars 28 remain fully extended and rollers 26 manually set in the uni-directional mode.

The retract function is initiated by allowing control actuator G, being spring-loaded, to return back to its center position, causing direction switch 216 to change back to its rest state. In this position power is applied to the controller A from terminal 207 through retract limit switch J and position switch 216 to terminal 209. With power applied at terminal 209, proper motor direction is established for retraction of spaced bars 28, but power is not yet applied to motor E.

As control actuator G is released beyond it center position, power is applied to motor E to retract spaced bars 28. Power is applied in direct proportion to the position of the actuator between its center position and its rest position, with zero speed at the center position and full speed at the rest position. At any point during retraction of spaced bars 28, Motor E may be stopped and its direction reversed to allow extension of spaced bars 28, as described above.

Retract movement of spaced bars 28 is accomplished as described for extension of spaced bars 28 above, and as spaced bars 28 begin to retract, stop 29 for extend limit switch H moves away from the switch causing closure of limit switch H and providing power continuity at terminal 208. Movement of spaced bars 28 continues, until retract limit switch J is opened by its stop 35, thus removing power from controller A and completing the cycle with spaced bars 28 fully retracted in the rest state as shown in FIG. 4.

Use of hand truck lift 10 for movement down a set of stairs is the same as described above for going up stairs, but the actions are reversed. For this function, rollers 26 are manually placed in the bi-directional mode for movement of the wheels in both directions.

CIRCUIT DESCRIPTION

Controller A is shown in the wiring diagram of FIG. 8. External charging power is applied at connector B (across terminals 201 and 202) to battery C (connected to terminals 203 and 204), via fuse D hooked to terminals 205 and 206. Battery C voltage is applied to control circuit 212 through fuse D via connections 218 and 220. Extend limit switch H and retract limit switch J are connected to controller A at terminals 207 and 208. The common points of limit switches H and J are wired together and tied to the common connection of direction switch 216. The normally closed contact of direction switch 216 is tied to terminal 209, and the normally open contact of direction switch 216 is tied to the normally open contact of retract limit switch J. Direction switch 216 is linked mechanically to the wiper arm of speed control potentiometer 214, and both are driven via concentric cable F by control actuator G. The wiper arm of speed control potentiometer 214 is wired to control circuit 212 by connection 226. Motor E is connected to controller A at terminals 210 and 211 and to control circuit 212 by wires 229 and 231.

Figure 9:
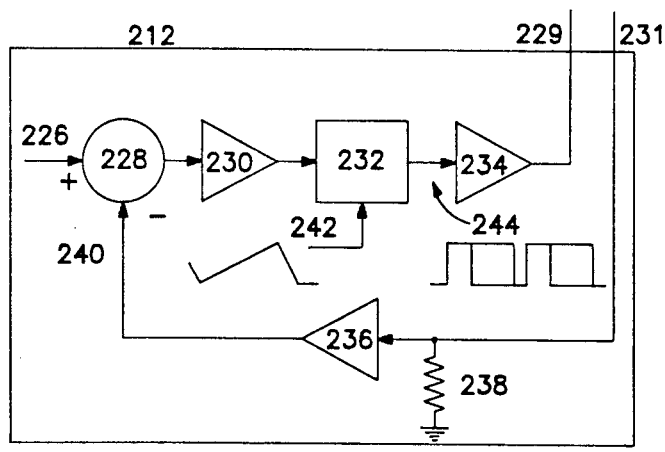
FIG. 9 is a block diagram illustrating electronic operation of the hand truck lift control circuit.

Control circuit 212 forms a standard Pulse Width Modulated (PWM) controller, which is used to control the average current into Motor E. In FIG. 9, desired speed signal 226, developed across potentiometer 214, is applied to the positive input of difference circuit 228. Actual motor speed 240 is sensed by feedback resistor 238, scaled by amplifier 236, and applied to the negative input of difference circuit 228. The difference between desired speed signal 226 and actual motor speed 240 is amplified by amplifier 230, and applied to one input of comparator 232. The other input to comparator 232 is reference input 242, a sawtooth waveform at approximately 12 kilo-hertz. The output of comparator 232 is motor signal 244. Motor signal 244 is a variable width 12 kilo-hertz square wave. The width of motor signal 244 is determined by the magnitude of difference between desired speed signal 226 and actual motor speed 240, acting in conjunction with comparator reference signal 242.

Motor signal 244 is amplified by power amplifier 234 and applied to Motor E by connection 229. Connection 231 provides a motor current return path to feedback resistor 238.

Figure 10:
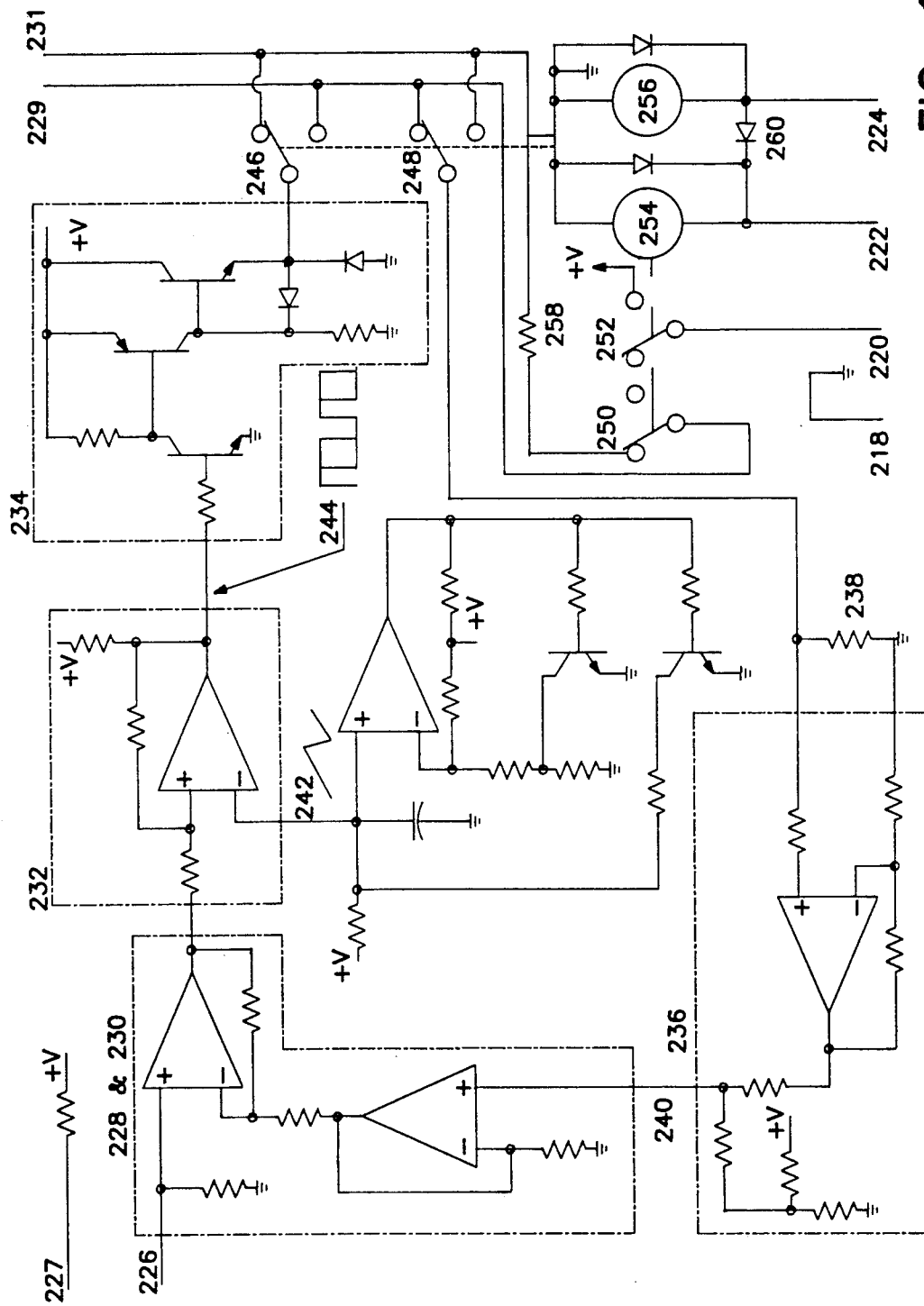
FIG. 10 is a schematic diagram of the hand truck lift control circuit.

FIG. 10 is a schematic diagram of Control Circuit 212, showing the preferred embodiment of control circuit 212. In addition to controlling average current into Motor E, provision is made for direction control by relay 256 action at contacts 246 and 248. Dynamic braking of Motor E is accomplished by contact 250 of power relay 254, in conjunction with dynamic braking resistor 258.

Utilizing the circuit description given above, elevating assembly 24 of hand truck lift 10 can easily be controlled so that hand truck lift 10 can be used to move an object 12 supported thereon up and down stairs.

It is thus seen that the present invention provides a novel hand truck lift. It is also seen that the present invention provides such a novel hand truck lift which can be easily used to move objects supported thereon up and down stairs with maximum control of the load. Many variations are apparent to those of skill in the art, and such variations are embodied within the spirit and scope of the present invention as measured by the following appended claims.

That which is claimed:

1. A hand truck lift comprising:
   a frame formed of spaced elongated bars;
   a base portion between said spaced elongated bars;
   a pair of spaced wheels mounted to said base portion;
   an elevating assembly attached to said base portion in a vertically moveable position by a plurality of guide bearings which fixedly hold said elevating assembly at an angle within said base portion such that said elevating assembly is substantially vertical when said hand truck lift is leaned in a rearward direction;
   a pair of rollers positioned on an end of said elevating assembly said elevating assembly being extendable downwardly while said hand truck lift is in a rearwardly tilted position, thereby causing said hand truck lift to elevate, being supported on said rollers of said elevating assembly; and
   means for moving said elevating assembly downwardly with respect to said frame.

2. The hand truck lift according to claim 1 wherein said elevating assembly comprises a pair of substantially parallel spaced bars positioned between said guide bearings with said rollers mounted on one end thereof having a rod extending therethrough and attached to said spaced bars of said elevating assembly.

3. The hand truck lift according to claim 1 wherein said means for moving said elevating assembly comprises an electric motor.

4. The hand truck lift according to claim 3 further including a battery to power said electric motor.

5. The hand truck lift according to claim 1 wherein said movable elevating assembly comprises rack and pinion.

6. The hand truck lift according to claim 1 wherein said rollers on said elevating assembly further comprises a ratchet associated therewith for engagement with a lever so that said rollers can be set to move in only one direction or in both directions.

7. The hand truck according to claim 1 further comprising:
   an electric motor;
   a battery to power said electric motor;
   a control circuit panel;
   limit switches in electrical communication with said control panel;
   a control actuator in electrical communication with said control panel.

8. The hand truck lift according to claim 7 wherein said control actuator comprises a movable handle which is connected to said control circuit panel by a concentric cable.

9. A process of moving objects up stairs comprising the steps of:
   providing a hand truck lift for supporting an object thereon comprising:
      a frame formed of spaced elongated bars,
      a base portion between said spaced elongated bars,
      a pair of spaced wheels mounted to said base portion,
      an elevating assembly attached to said frame by a plurality of guide bearings which fixedly hold said elevating assembly at an angle within said base portion such that said elevating assembly is substantially vertical when said hand truck lift is leaned in a rearward direction,
      a pair of rollers on said elevating assembly,
      said elevating assembly being extendable downwardly while said hand truck lift is in a rearwardly tilted position, thereby permitting said hand truck lift to elevate, and
   means for moving said elevating assembly downwardly with respect to said frame;
   placing said spaced wheels against a next higher stair;
   tilting said hand truck lift with an object supported thereon in a rearward direction;
   actuating said means for moving said elevating assembly to extend said elevating assembly downwardly, thereby causing said hand truck lift and said object supported thereon to elevate at least to a height of the next higher stair;
   rolling said hand truck lift in a rearward direction, until said spaced wheels are securely over the next higher stair; and
   retracting said means for moving said elevating assembly to retract said elevating assembly, thereby resting said hand truck lift upon the next higher stair.

10. A process of moving objects down stairs comprising the steps of:
   providing a hand truck lift for supporting an object thereon comprising:
      a frame formed of spaced elongated bars,
      a base portion between said spaced elongated bars,
      a pair of spaced wheels mounted to said base portion,
      an elevating assembly attached to said frame by a plurality of guide bearings which fixedly hold said elevating assembly at an angle within said base portion such that said elevating assembly is substantially vertical when said hand truck lift is leaned in a rearward direction,
      a pair of rollers on said elevating assembly, said elevating assembly being extendable downwardly while said hand truck lift is in a rearwardly tilted position, thereby permitting said hand truck lift to elevate, and means for moving said elevating assembly downwardly with respect to said frame;

placing said hand truck lift in a rearwardly tilted position near an edge of a stair above a next lower stair such that said elevating assembly overhangs the edge;

actuating said means for moving said elevating assembly to extend said elevating assembly downwardly until said elevating assembly securely contacts the top of the next lower stair;

rolling said hand truck lift forward on said rollers of said elevating assembly while maintaining said rearwardly tilted position until said spaced wheels are above the next lower stair;

retracting said means for moving said elevating assembly to retract said elevating assembly, thereby lowering said hand truck lift to rest on said spaced wheels on the next lower stair.

* * * * *